United States Patent [19]

Lee

[11] Patent Number: 4,788,715

[45] Date of Patent: Nov. 29, 1988

[54] ANNOUNCING WAITING TIMES IN QUEUING SYSTEMS

[75] Inventor: Dooyong Lee, Middletown, N.J.

[73] Assignee: American Telephone and Telegraph Company AT&T Bell Laboratories, Murray Hill, N.J.

[21] Appl. No.: 920,260

[22] Filed: Oct. 16, 1986

[51] Int. Cl.$^4$ .................. H04M 1/64; H04M 1/65
[52] U.S. Cl. .................................. 379/84; 379/88
[58] Field of Search .................. 379/84, 215, 266, 309

[56] References Cited

U.S. PATENT DOCUMENTS

| | | | |
|---|---|---|---|
| 2,922,847 | 1/1960 | Dunning | 179/27 |
| 3,111,561 | 11/1963 | Dunning | 179/27 |
| 4,066,847 | 1/1978 | Giordano | 379/84 |
| 4,150,255 | 4/1979 | Theis et al. | 379/84 |

OTHER PUBLICATIONS

J. L. Flanagan et al., "Computer Synthesis of Speech by Concatenation of Formant-Coded Words", Speech Synthesis, 1973, pp. 479-496 (Reprinted from The Bell System Technical Journal, vol. 50, 1971, pp. 1541-1558.)
"Switching Products-5ESS$^{TM}$ Switch", ISDN Service Descriptions, AT&T 5D5-900-900, Issue 1.00, published by AT&T Company, Apr. 1986, pp. 4.1-3-4.1-4.

Primary Examiner—Vincent P. Canney
Assistant Examiner—James E. Tomassini
Attorney, Agent, or Firm—Werner Ulrich

[57] ABSTRACT

In an automatic call distributor system, calls waiting in a queue to receive attendant service are informed of the expected waiting time prior to connection to an attendant. This permits callers to defer a call if the queue is excessively long and they can place the call at a later time. The announcements are periodically updated to reassure customers that they are, in fact, progressing in the queue. Customers are given the opportunity to leave a message such as a telephone number if they do not wish to wait. Advantageously, such an arrangement avoids a situation wherein a customer impatiently disconnects just before being served or waits too long unexpectedly because of absence of information on remaining waiting time.

13 Claims, 5 Drawing Sheets

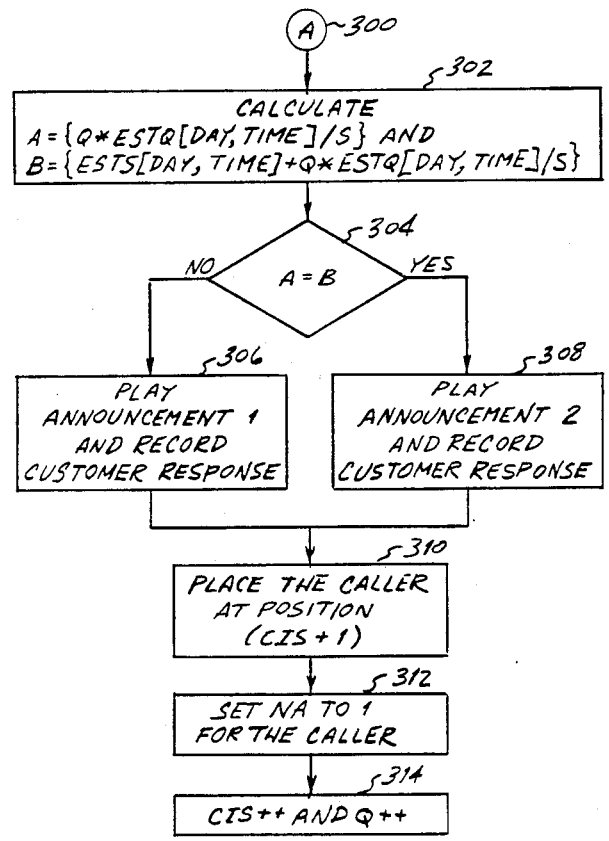

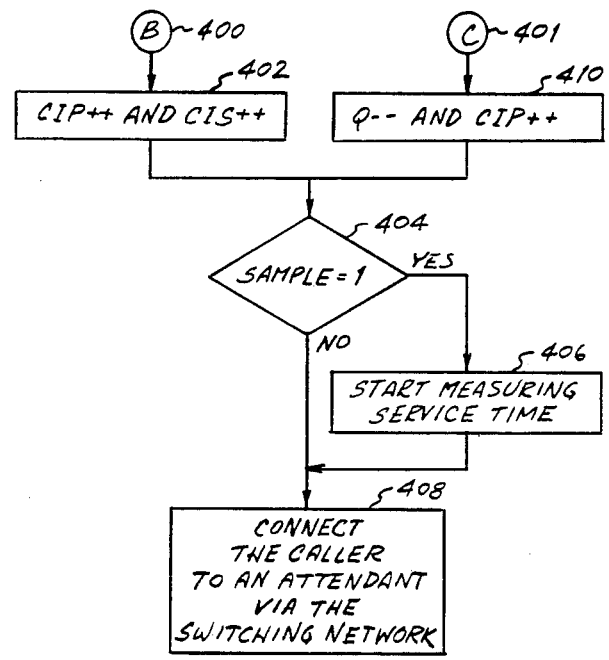

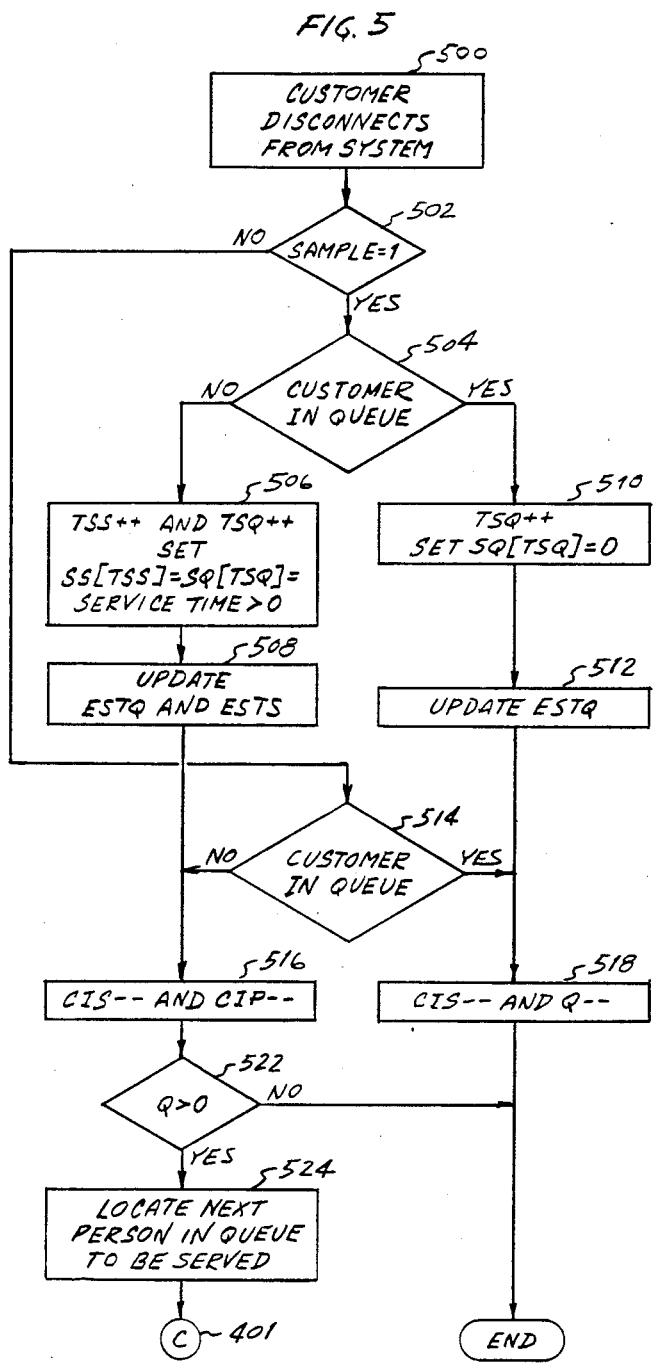

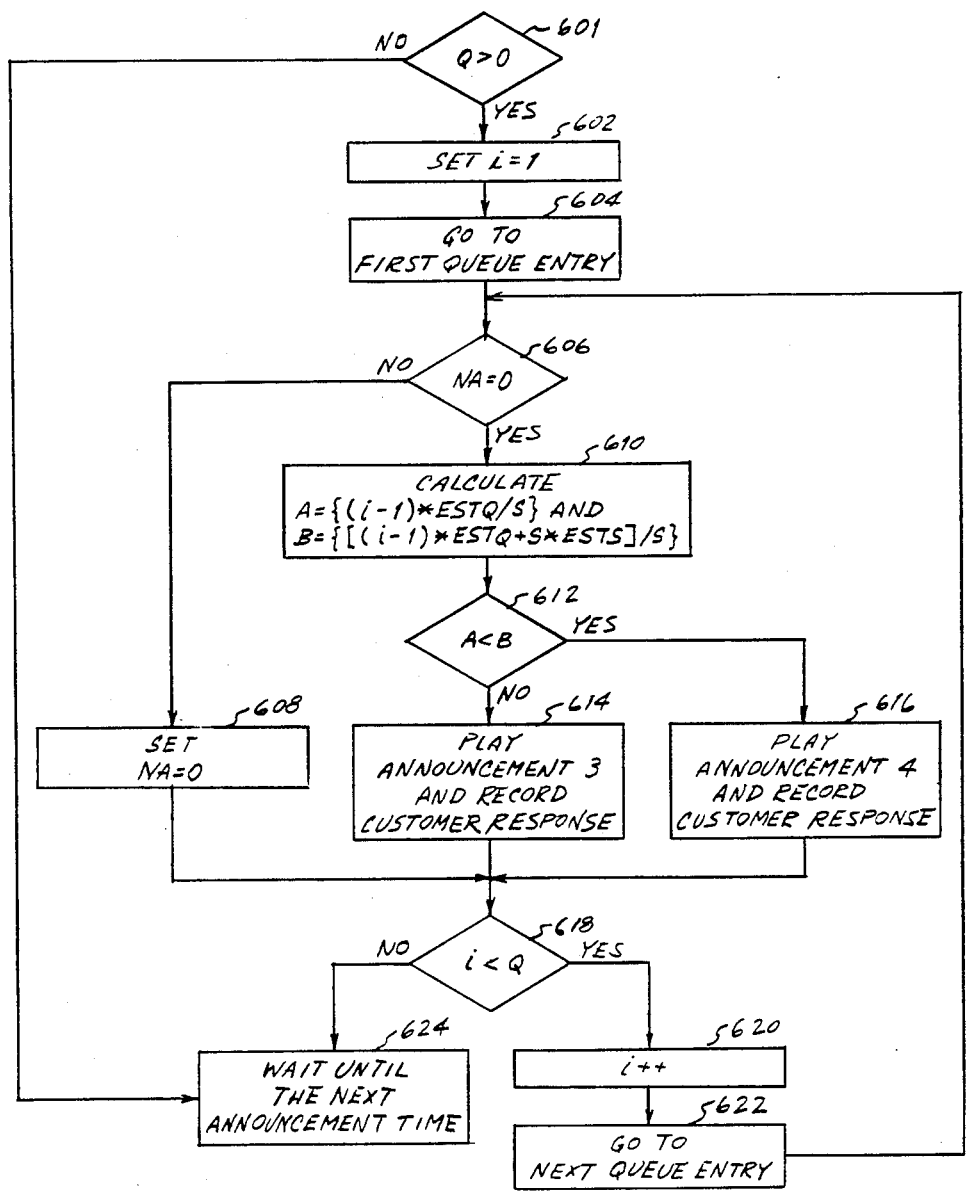

ANNOUNCING WAITING TIMES IN QUEUING SYSTEMS

TECHNICAL FIELD

This invention relates to a method and apparatus for queuing telecommunications calls and specifically of informing callers of delays in processing their requests.

Problem

Automatic call distributor (ACD) systems comprise apparatus for connecting incoming telephone calls to one of a group of attendants for service. Such service may consist, for example, of taking orders from customers for airline reservations, department store ordering and the like. Because customer calls are sometimes received during heavy traffic periods, it is necessary to queue calls incoming to the distributor systems when all attendants are temporarily busy serving other requests. Typically, under such circumstances calls which are placed in the queue are connected to an announcement which advises the customer that the call will be served as soon as an attendant becomes available and will not be disconnected before that time.

In such systems, a customer has no information about the length of the queue and of how long the customer will have to wait before an attendant becomes available. Resultingly, the customer may hang up and lose the opportunity of reaching an attendant after a very short wait, or may wait much longer than anticipated until an attendant becomes available.

A problem of the prior art, therefore, is that a customer served by such a call queuing system heretofore has received no specific information of the length of the expected wait before a queued call will be served.

Solution

The foregoing problem is solved and a technical advance is made over the prior art in accordance with the present invention wherein facilities are provided for determining the volume of call traffic awaiting service and calculating attendant parameters in serving calls to derive information on the amount of time delay that queued calls are projected to encounter and then advantageously for supplying that information to each queued call. That information is periodically updated and according to human factors criteria is supplied at appropriate times during each queued call to advise each caller of the update. Resultant advantages are that more precise explanations for delayed calls are afforded to customers, fewer calls are abandoned for lack of information about waiting times, and telephone companies and others served by call distributor systems are not plagued by excessive calls reinitiated following the abandoned calls.

The measurements of expected waiting time are continually being performed by measurement facilities in an illustrative call distributor system. These facilities periodically during a waiting period control transmission of announcements which indicate the present estimate of the length or time range of the expected wait that the customer will encounter. Illustratively, such an announcement is transmitted on a call when it first enters a queue of the distributor system as a consequence of all of the servers being busy. Another updated announcement is provided in accordance with an update as long as the call remains in the queue. Advantageously, such an arrangement takes into account dynamic changes in speed of handling customer requests. Furthermore, such updating feedback gives a customer reassuring information that the customer is indeed progressing in the queue and that the expected waiting time remaining is decreasing.

The parameters for calculating expected waiting time are selected as a function of the day of the week and the time of day. These parameters are updated as required by sampling the delay time encountered by new traffic. Advantageously, such an arrangement allows parameters to be determined accurately and to be changed with changing customer habits.

Customers may supply their telephone numbers to the ACD for a subsequent return of their call if the delay is unacceptably long. Advantageously, this permits a vendor to return such calls at a less busy time and permits the customer to make an informed decision of whether to wait now or have the call returned.

BRIEF DESCRIPTION OF THE DRAWING

FIGS. 2-6 are flow charts of programs executed for estimating waiting times and for controlling announcements of such waiting times to calling customers.

DETAILED DESCRIPTION

Figure 1:
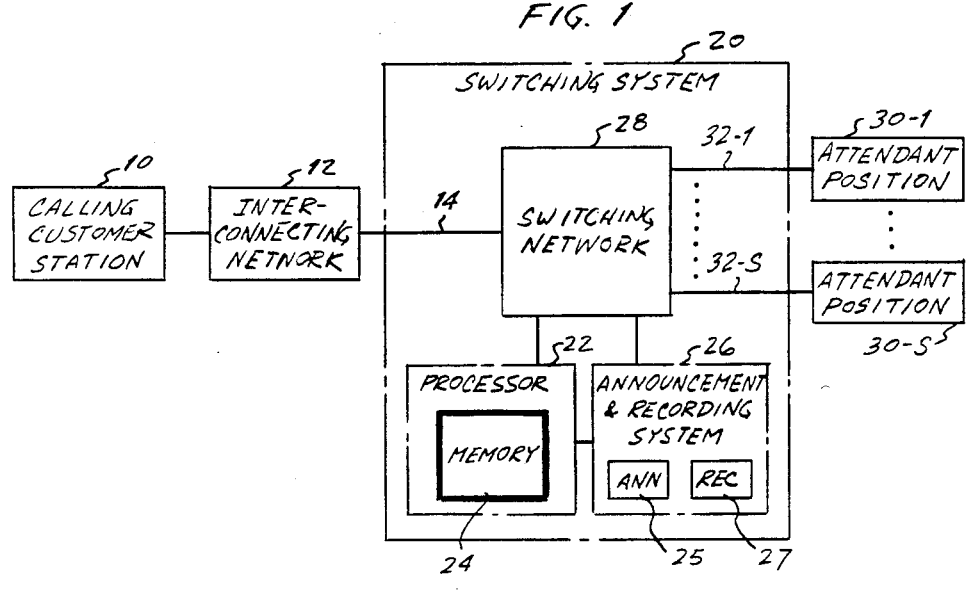
FIG. 1 is a block diagram including an automatic call distributor switching system for connecting calling customers to one of a plurality of attendant positions.

FIG. 1 is a block diagram of an exemplary embodiment of the invention. A calling customer 10 is connected through an interconnecting network 12 such as the public telephone network, to an incoming link 14, to a switch 20. Switch 20 is used to connect an incoming link 14 to one of S attendant positions 30-1, . . . ,30-S, controlled by the attendants of an automatic call distributor system. Switch 20 is controlled by a processor 22 comprising a memory 24. Switch 20 comprises switching network 28 controlled by processor 22 for setting up connections between incoming link such as link 14 from interconnecting network 12 and one of the links 32-1, . . . ,32-S connected to attendant positions 30-1, . . . ,30-S, respectively. Switching network 28 is also used to connect the output of an announcement and recording system 26, comprising announcement circuits 25 and record circuits 27, to an incoming link 14 to return an announcement to a calling customer station 10 and to accept a customer message such as a directory number for returning the call. Announcement and recording system 26 is also under the control of the processor 22.

Most of the changes required to implement the present invention are contained in memory 24 within processor 22. Memory 24 is used to store the program for controlling switch 20, including announcement and recording system 26, to store data about calls in the switch 20, and to store data for estimating expected waiting time until an attendant becomes available. Programs for which flow charts are shown in FIGS. 2-6 are stored in memory 24 and process data stored in memory 24.

For convenience, a glossary forms part of this detailed description. This glossary defines all parameters used herein and is alphabetically arranged.

In order to serve the incoming calls, a number of attendant or service positions S are available for serving the calls. Calls which cannot be served immediately are placed in a queue which has QS positions. As the service positions are filled up, customers are entered in the queue.

In order to save time and avoid movement of all customers in the queue, the queue is preferably administered through a series of pointers which place the various customers in the queue in their proper sequence without having to move the contents of the memory blocks for each slot in the queue. Queue administration memory keeps track of the first occupied position in the queue, i.e., the next queue entry to be served, and of the last occupied position in the queue, i.e., the queue entry to which a new queue entry is to be linked. As a service position becomes available because a server has completed processing a call, the customer at the first position in the queue is connected to the server and the pointers associated with queued customers are updated.

In order to handle queues which may have special priority calls, the priority calls may receive preferred treatment by being placed at the front of the queue through the use of these pointers. Priority calls will be relatively infrequent so that the calculations of queue delay time which are discussed further on herein will not be substantially affected.

Figure 2:
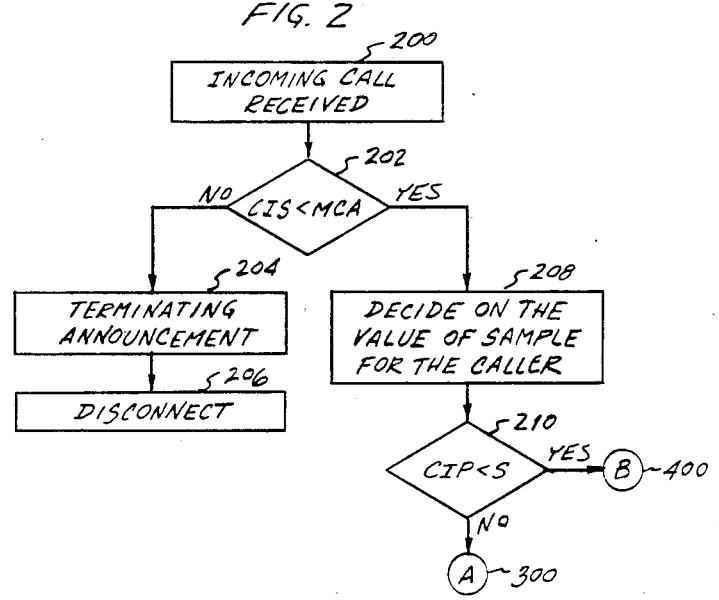

FIG. 2 shows the initial actions performed when a call comes into the call distributor system. Action block 200 indicates an incoming call is received. In test 202 a check is made whether a customer can be served by the automatic call distributor system. This test is performed by checking whether the number of calls in the system (CIS) is already as great as the maximum number of calls allowed (MCA). If the maximum number of calls allowed is already being processed, indicated by the no output of decision block 202, then the customer receives a terminating announcement indicating to the customer that he cannot be served at this time (action block 204) and the customer is disconnected (action block 206).

If the number of calls in the system is less than the maximum number of calls allowed, the call can then be placed either in the queue or can be directly served. At this point a decision is made on whether to sample this particular call for the purposes of measuring time in order to estimate waiting time for future calls in the queue (action block 208). If the call is to be sampled, the value of 1 will be assigned a flag called sample which is associated with the call until the call is cleared from the automatic call distribution system. Thereafter, if the value of sample is 1 then the call will be measured, otherwise the call will not be measured.

A calculate flag, CALC (DAY,TIME), indicating whether or not an estimation time calculation is required at this day and time is maintained for the system. If the nature of the traffic of the automatic call distributor is such that the expected service time tends to be fairly stable then it may not be necessary to measure this time frequently and the time stored as a parameter is rarely updated. Similarly, if the expected service time is stable on certain days or during certain hours it may also not be necessary to make these measurements but to use a stored parameter for such days and hours. A calculate flag controls the sampling process. The sampling flag can only be set to one if the calculate flag is one. Otherwise the sampling flag is automatically set to 0. The calculate flag can be set to 0 or 1 via a recent change and verify procedure at the request of a service provider. At any time when a service provider feels that the current values of expected waiting time are stable enough, he/she may request that the calculate flag be set to 0.

The value of sample for each call is determined randomly. When measurements are taken (calculate flag=1), on the average, some given percentage, say ten percent, of the calls are sampled. For large automatic call distribution systems processing very many calls, the percentage sampled can be lower, whereas for small call distribution systems handling few calls a larger number, possibly as high as one hundred percent, could be sampled.

After the value of the sample flag has been determined, test 210 is executed to determine whether the incoming call can be directly connected to an attendant or must be placed in a queue. If the calls in progress (CIP) are fewer than the number of servers, then the call can be directly connected to an attendant as indicated by the "yes" of decision block 210. In that case, block 402 of FIG. 4, to be subsequently described, is entered.

If the customer is to be placed in a queue ("no" output of decision block 210), a transfer is executed to block 302 of FIG. 3. In block 302 a calculation is made to estimate the time that the customer will spend in the queue before the customer is connected to an attendant. The initial estimated lower bound of this time, A, is the product of the number of customers in the queue times a factor ESTQ, to be discussed hereinafter, divided by the number of servers; the initial estimated upper bound, B, is the initial estimated lower bound increased by ESTS, to be discussed hereinafter. After these initial bounds have been calculated, both are rounded to the nearest higher number of minutes.

Next, test 304 is executed to determine if the rounded values of A and B are equal. If not, then an announcement 1 of Table I is returned. If A and B in rounded form are equal, then announcement 2 of Table I is returned. Announcement 2 is simpler in that it provides only one delay interval to the customer. Following either announcement, the customer is given an opportunity to leave his telephone number to be recorded for a subsequent call from the service provider. The customer is then placed in the queue at the next available position, which is behind Q queue entries, where Q is the number of entries already in the queue. Next, the new arrival (NA) flag is set to one for the caller in order to prevent an immediate updating announcement from being given to that customer (action box 312). Next, the count of the number of calls in the system (CIS) and the number of calls in the queue (Q) are both incremented by one (action box 314). (The term Q++ shown in block 314 and other blocks indicates that Q is to be incremented by one).

TABLE I

Announcements 1,3

All our operators are busy at this time. There are S operators and Q people in front of you already waiting in the queue. Your expected waiting time is between A and B minutes. If you wish to leave your number, please wait for the signal.

Announcements 2,4

All our operators are busy at this time. There are S operators and Q people in front of you already waiting in the queue. Your expected waiting time is about A minutes. If you wish to leave your number, please wait for the signal.

FIG. 4 indicates the actions to be performed when a customer is to be connected to an attendant. If the customer is connected immediately without waiting in the queue, then the number of calls in progress (CIP) (actually being served by attendants) and the number of calls in the system (CIS) are both incremented by one (action block 402). The value of the sample flag is checked in test 404. If the sample flag is 1, measurements are to be performed and the system starts measuring the service time for this call (action box 406). The starting time is recorded for subsequent subtraction from the time that the call is disconnected. Next, whether or not measurements are to be performed, the caller is connected to an attendant via the switching network (action box 408).

FIG. 5 describes the actions to be performed to update measurements for sampled customers when a customer leaves the queue to be served by an attendant or when service by an attendant has been completed. Decision block 502 is used to determine whether the sample flag for the particular customer leaving the queue or attendant is being sampled. If not, the actions described in blocks 506 and 508 or 510 and 512 can be bypassed. If the customer is being measured, then test 504 is used to determine whether the customer was being served by an attendant or was in the queue. If the customer is not in the queue but is being disconnected after having been served by an attendant, then the actions of action box 506 are performed. The parameters indicating the total number of customers sampled (TSQ) and the total number of sampled customers actually served (TSS) are incremented by one. The time that the customer actually was being served by the attendant (this number is greater than 0 for customers who are actually served by an attendant) and these values are then used in block 508 to update ESTQ and ESTS. ESTQ and ESTS are exactly defined in the glossary; but briefly, ESTQ is the sum of all sampled attendant service times divided by the total number of customers sampled, whereas ESTS is the sum of sampled attendant service times for served customers only divided by the number of customers sampled who were actually served. Both ESTS and ESTQ are functions of day (i.e., day of the week) and time, so that different values may be used for different traffic periods. A matrix of values of ESTS and ESTQ as a function of day of the week and time is stored; the individual quantities in the matrix may be updated as desired based on new samples and measurements as described herein.

If the customer being sampled is in the queue as determined by test 504, then the quantity TSQ is incremented by one and the sample service time value for the sample is set to 0. In this case only ESTQ is updated; since the customer was not served and ESTS is the estimated service time for customers actually served the estimated value of ESTS is not affected by this customer.

For customers not being sampled, test 514 is executed to determine whether the customer is in the queue. If the customer is in the queue, the actions to be performed which are the same actions to be performed after action block 512 for measured customers, are specified in action block 518, namely the number of calls in the system (CIS) is decremented by one and the number of calls in the queue (Q) is decremented by one. (Q− − signifies that Q is being decremented by one). No further actions are required.

If the customer who has left the system was not in the queue but was being served by an attendant, then the number of calls in the system (CIS) is decremented by one and the number of calls in progress (CIP) is also decremented by one (action box 516). These actions are also performed for measured calls leaving the system after the actions of action block 508. Thereafter, a test is made (test 522) of the quantity Q to check whether a customer is in the queue requiring service. If Q is not greater than 0 no further actions are required since no more customers are to be served. If Q is greater than 0 then the next customer in the queue to be served is located (action block 524) and that queue slot is emptied and the customer is connected to the attendant associated with an available attendant slot. Next, the actions on FIG. 4, action block 410 are executed. The quantity Q is decremented by one because a customer has left the queue, the quantity CIP is incremented by one because an attendant position is being seized. Next, the value of the sample flagged for this particular call is determined and the actions previously discussed with respect to FIG. 4, starting with test 404, are completed.

FIG. 6 describes actions performed to give customers periodic expected waiting time announcements. This is to allow customers to receive updated information on the expected waiting time so that they may be reassured that they are progressing in the queue; alternatively, if the progress is unduly slow, they may decide to hang up based on this new information. Further, this periodic expected waiting time announcement reassures the customers that they have not been forgotten. First, a check is made (test 601) to determine if any customers are in the queue, i.e., if Q>0. If not, no further action need be taken until the next announcement time. If Q>0, a program loop is entered for announcing the expected wait to all appropriate customers in the queue. To initialize the loop, a parameter i is set to the value one (action block 602). This parameter i will advance eventually to a value of Q, the number of customers in the queue, as all the customers in the queue are served with an update announcement. Following the initialization of i, the system examines the first queue entry (action block 604). A test (test 606) is then made of the value of NA (the new arrival flag described with respect to FIG. 3, block 312). If the NA flag is marked to one, this is an indication that the customer received an initial announcement and has not yet received a periodic waiting announcement. Since the initial announcement may have been delivered only a few seconds ago, the customer does not receive the periodic expected waiting time announcement now. Note that the new arrival flag might alternatively be set to one only if the time from the time that the customer has received the initial expected waiting time announcement until the next time that a periodic expected waiting time announcement will be delivered is less than some threshhold; in that case this threshhold can be selected to be substantially less than the time between periodic expected waiting time announcements.

If the NA flag is set to one, no announcement is delivered and the NA flag is reset so that at the next periodic waiting time announcement interval the customer will receive an announcement. If the NA flag is set to 0, then the announcements comparable to the initial announcements 3 and 4 (Table I), similar to announcements 1 and 2 described with respect to blocks 302, 304, 306, and 308 of FIG. 3, will be generated and delivered to the customer. This is shown in action block 610 in which values of A and B are calculated, and in decision block 612 in which A and B are compared to see if the customer should receive a range announcement (action block 616) or a single quantity announcement (action block 614). Following either of these announcements, the customer is given an opportunity to leave his telephone number to be recorded for a subsequent call from the service provider. After the announcement has been generated for the customer or after the new arrival flag has been reset the quantity i is tested (decision block 618) to see if there are any more customers in the queue. If i is less than Q, then there are more customers and i is incremented by one (action block 620) and the system examines the next queue entry (action block 622). Otherwise, if i is equal to Q the periodic expected waiting time announcement process has been completed and the system does not generate any further periodic announcements until the next announcement time (action block 618).

It is to be understood that the above description is only of one preferred embodiment of the invention. Numerous other arrangements may be devised by one skilled in the art without departing from the spirit and scope of the invention. The invention is thus limited only as defined in the accompanying claims.

GLOSSARY

CALC[DAY,TIME]: A flag indicating whether or not the ESTQ/ESTS calculation is desired. It is set to 1 if the ESTQ and ESTS values are to be updated (or recalculated) and to 0 if the current values are satisfactory.

CIP (Calls in Progress): Number of calls currently being served by operators.

CIS (Calls In System): Number of calls in the system (i.e., CIP plus Q).

DAY: Day parameter used in the ESTS/ESTQ calculation (e.g., Monday).

ESTQ[DAY,TIME] (Expected Service Time Queue for the given values of DAY & TIME): An average attendant service time for all samples (i.e., including those dropping out of the queue). $(SQ[1]+SQ[2]+\ldots +SQ[TSQ])/TSQ$, where $SQ[i]$ is the service time in minutes for the ith sample no matter whether the sample is eventually served by an attendant or drops out of the queue. $SQ[i]=0$ means the ith sample has left while in the queue. ESTQ is used to estimate the total service time required to serve the customers currently found in the queue.

ESTS[DAY,TIME] (Expected Service Time Service for the given values of DAY & TIME): $SS[1]+SS[2]+\ldots +SS[TSS])/TSS$, where $SS[i]$ is the attendant service time in minutes for the ith sample actually served. Note $SS[i]$ cannot be zero. ESTS, unlike ESTQ, reflects only those samples eventually receiving the attendant service. ESTS is used to estimate the total service time required to finish serving all customers currently receiving attendant service.

i: A parameter used to keep track of the number of queue entries examined for generating periodic announcements.

MCA (Maximum Calls Allowed): Maximum number of calls allowed in the system (S plus QS).

NA (New Arrival): A parameter associated with each person in the system indicating whether or not he/she has arrived at the system since the last periodic expected waiting time announcement. It is set to 1 if he/she arrived after the last announcement and to 0 otherwise. This is used to ensure that a recently arrived caller (with the NA value of 1) does not experience two consecutive announcements—one for being placed in a queue and another from the periodic announcement.

Q (Queue): Number of callers in the queue.

QS (Queue Slots): Number of queue slots available.

S (Servers): Number of operator positions.

SAMPLE: A flag associated with a caller to indicate whether or not he/she has been selected as a sample for the ESTQ/ESTS calculation. 1 means he/she is a sample, and 0 means he/she is not.

TIME: Time range parameter used in the ESTS/ESTQ calculation (e.g., between 9 and noon).

TSQ (Total Sample Queued): Total number of the ESTQ samples (either queued or served).

TSS (Total Sample Served): Total number of the ESTS samples (i.e., samples actually served by an attendant).

What is claimed is:

1. In a call switching system comprising a queue for storing incoming call requests for service that are to be delayed, a method of serving each such request comprising the steps of:
    measuring an expected time delay that each queued call request is to encounter before service;
    supplying to a caller communication path of said each queued call request an indication of the measured time delay.

2. The method of claim 1 further comprising the step of:
    recording a caller callback message received over said caller communication path after the supplying of the indication of said measured time delay.

3. In an automatic call distributor system comprising a queue for storing incoming call requests that cannot be immediately served by an available server, apparatus for processing an incoming call with a queued request comprising:
    processor means for measuring a waiting time before a call having a queued request is to be served by an available server; and
    means controlled by said processor means for announcing on said queued call the waiting time measured by said processor means.

4. In a call processing system,
    means for determining the magnitude of the time delay in serving a received call, said determining means comprising means for ascertaining the average holding time of calls handled by said system and a number of calls waiting by said system and determining said magnitude based upon said holding time and said number of calls waiting and
    means responsive to a receipt of said received call for supplying said call with message signals for informing a caller of the magnitude of the time delay determined by said determining means.

5. The call processing system of claim 4 wherein said message signals comprise a humanly detectable time delay indication.

6. The call processing system of claim 5 wherein said humanly detectable time delay indication comprises an announcement message.

7. The call processing system of claim 5 wherein said means for supplying message signals further comprises means for recording a callback message from a customer on said call.

8. In a call processing system, means for determining the time delay in serving a received call; and
    means responsive to a receipt of said received call for supplying said call with message signals for informing a caller of the length of the time delay determined by said determining means;
wherein said call processing system comprises an automatic call distributor system having a plurality of attendant positions and said determining means comprises means for ascertaining the average call holding time of said plurality of attendant positions and means for ascertaining the number of calls awaiting service by said plurality of attendants.

9. The call processing system of claim 8 wherein said means for determining operates periodically to determine a modified time delay, and wherein said means for supplying said call with message signals operate periodically to supply message signals of the modified time delay determined by said means for determining.

10. The call processing system of claim 9 wherein said means for supplying message signals further comprises means for recording a callback message from a customer on said call.

11. The call processing system of claim 10 wherein said means for supplying said call with message signals supplies message signals of a range of time delay determined by said means for determining.

12. The call processing system of claim 11 wherein said means for ascertaining comprises a memory table of average holding time, said memory table having entries for different days of the week and for different times of day.

13. The call processing system of claim 12 wherein said means for ascertaining updates entries of said memory table by sampling the holding times of calls served by said attendant positions.

* * * * *